No. 892,935. PATENTED JULY 7, 1908.
A. CATALDO.
BICYCLE CRANK.
APPLICATION FILED AUG. 28, 1907.
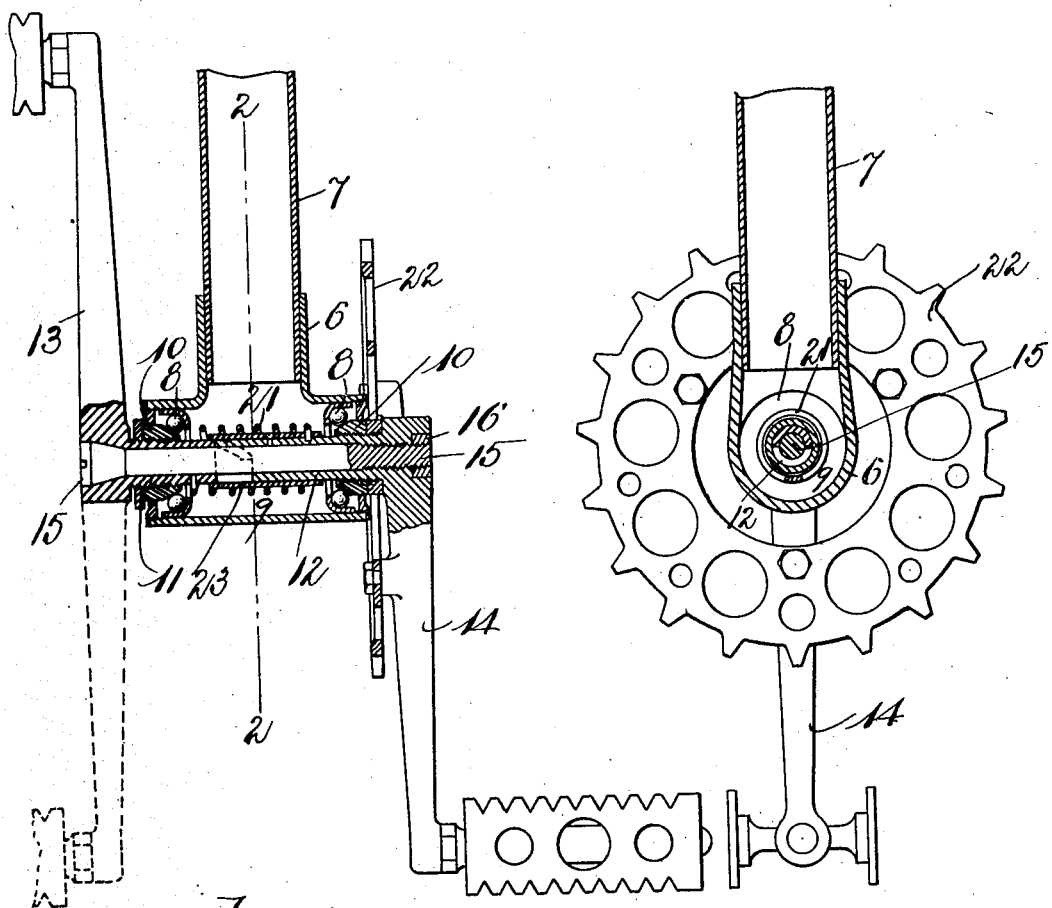
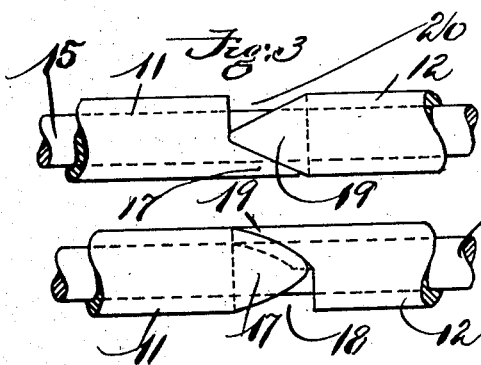
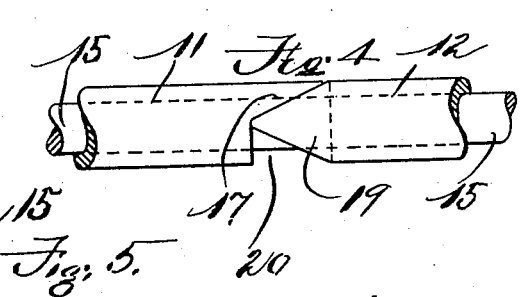
Witnesses:
William C. Glass.
Francis H. Bishop.
Inventor:
Anthony Cataldo.
by his attorney, Charles S. Gooding.

UNITED STATES PATENT OFFICE.

ANTHONY CATALDO, OF BOSTON, MASSACHUSETTS.

BICYCLE-CRANK.

No. 892,935.　　　　Specification of Letters Patent.　　　　Patented July 7, 1908.

Application filed August 28, 1907. Serial No. 390,448.

*To all whom it may concern:*

Be it known that I, ANTHONY CATALDO, a citizen of the United States, residing at Boston, in the county of Suffolk and State of Massachusetts, have invented new and useful Improvements in Bicycle-Cranks, of which the following is a specification.

This invention relates to an improvement in bicycles especially relating to the crank shaft of said bicycles and is particularly adapted for use in motor bicycles, the object of the invention being to provide a means whereby the two cranks may be brought into such a position that they are in alinement one with the other so that the pedals are also in alinement and the rider can have both feet at the same level when the machine is coasting or when it is being driven by the motor in the case of a motor bicycle.

In bicycles as now constructed it is understood that the two cranks are located 180° apart instead of in alinement, therefore, when one of the pedals is down the other will be up, thus making it, especially in the case of a motor bicycle, uncomfortable for the rider for the reason that he is obliged to hold one foot considerably elevated above the other for the larger part of the time or indeed for all of the time when he is utilizing the motor for driving the wheel and is not expending any energy in the rotation of the crank shaft.

The invention consists in a crank shaft for bicycles formed as hereinafter constructed and in the combination of parts with said crank shaft all as set forth in the following specification and particularly as pointed out in the claims thereof.

Referring to the drawings: Figure 1 is a vertical sectional elevation, partly broken away, taken through the center of the crank shaft, one of the cranks and its pedal being shown up and the other down and one of said cranks also being shown in dotted lines down. Fig. 2 is a section taken on line 2—2, Fig. 1, looking toward the right in said figure, certain parts being in elevation. Fig. 3 is a detail plan of the two members of the crank shaft, the same being broken away and shown in connection with the connecting bolt which passes therethrough, said parts being in the position which they occupy with relation to each other when the cranks are located in a position at 180° apart. Fig. 4 is a plan view similar to Fig. 3, showing the crank shaft members in the position which they occupy when the cranks are in alinement, as shown in full and dotted lines, respectively, in Fig. 1. Fig. 5 is a front elevation of the two members of the crank shaft and their connecting bolt when in the position illustrated in plan view in Fig. 3.

Like numerals refer to like parts throughout the several views of the drawings.

In the drawings, 6 is the crank hanger of a bicycle of the usual construction showing the same attached to a portion 7 of the frame.

8, 8 are ball bearings of well known construction in which is rotatably mounted a crank shaft 9 with cones 10, 10 of usual construction fast thereto. The crank shaft 9 is formed in two parts 11 and 12. The part 11 has a crank 13 thereon which is preferably integral therewith. The part 12 has a crank 14 thereon which is preferably also integral therewith. The shaft 9 as a whole is a hollow shaft and through this hollow shaft projects a bolt 15 provided with a nut 16 which holds the two parts 11 and 12 of the crank shaft together and prevents them from moving longitudinally relatively to each other. The part 11 has a tooth 17 thereon which projects into a recess 18 formed in the part 12, while the part 12 has a tooth 19 thereon which projects into a recess 20 in the part 11. It will be noted that the recess in the part 12 is of sufficient extent to allow the other part 11 to be rotated through a portion of a rotation relatively to the part 12.

The teeth 17 and 19 extend from the inner ends of the parts 11 and 12, respectively, toward each other and are adapted to engage each other, the width of each of said teeth being less than the circumferential space or recess between the opposite sides thereof, respectively, whereby one of said parts is adapted to rotate through a portion of a rotation relatively to the other of said parts. A spring 21 encircles the shaft 9 and normally holds the teeth 17 and 19 in engagement with each other. One end of the spring 21 engages the part 11, while the other end engages the part 12. A sprocket gear 22 is fastened to the crank 14 and rotates with said crank and consequently with the part 12 of the crank shaft. The gear 22 is connected by means of a sprocket chain with the usual sprocket gear by means of which the rear wheel is rotated. A sleeve 23 fast to the part 12 projects over the part 11 and incloses the portion of the two parts 11 and 12 upon which the teeth 17 and 19 are located, thus preventing any dirt or foreign matter of any kind from entering the space between the ends of the parts 11 and 12.

The general operation of the device hereinbefore specifically described is as follows: Assuming the parts to be in the position illustrated in full lines, Fig. 1, and the rider desires to bring both of the cranks in alinement so that the pedals will be at the same level he holds the crank 14 downwardly and rotates the crank 13 backwardly through an angle of about 180°, thus bringing the tooth 17 from the position illustrated in Fig. 3 to that illustrated in Fig. 4 and causing the crank 13 to project downwardly in alinement with the crank 14 and bringing the two pedals supported on said cranks into alinement with each other and at substantially the same height from the ground so that the feet of the rider are then on the same level. When he desires to rotate the crank shaft 9 by means of the cranks 13 and 14, he releases the pressure upon the pedal which is attached to the crank 13 and the spring 21 then reacts, the part 11 moving from the position illustrated in Fig. 4 to that illustrated in Fig. 3 and carrying its crank 13 with it into the position illustrated in full lines, Fig. 1. The parts are then in the correct relative position for the rider to rotate the crank shaft by means of the cranks and pedals in the usual manner.

Having thus described my invention, what I claim and desire by Letters Patent to secure is:

1. In a bicycle, a crank hanger, a crank shaft in two parts journaled in said hanger, a crank on each of said parts, respectively, one of said parts adapted to be rotated through a portion of a rotation relatively to the other of said parts, and a spring encircling said parts and fast at opposite ends thereof, respectively, to said parts.

2. In a bicycle, a crank hanger, a crank shaft in two parts journaled in said hanger, a crank on each of said parts, respectively, and a tooth on one of said parts adapted to project into a recess in the other of said parts, said recess being of sufficient extent to allow one of said parts to be rotated through a portion of a rotation relatively to the other of said parts.

3. In a bicycle, a crank hanger, a hollow crank shaft in two parts journaled in said hanger, a crank on each of said parts, respectively, a tooth on one of said parts adapted to project into a recess in the other of said parts, said recess being of sufficient extent to allow one of said parts to be rotated through a portion of a rotation relatively to the other of said parts, and a bolt extending through said hollow shaft and connecting said parts together, whereby longitudinal movement thereof relatively to each other is prevented.

4. In a bicycle, a crank hanger, a hollow crank shaft in two parts journaled in said hanger, a crank on each of said parts, respectively, a tooth on one of said parts adapted to project into a recess in the other of said parts, said recess being of sufficient extent to allow one of said parts to be rotated through a portion of a rotation relatively to the other of said parts, a bolt extending through said hollow shaft and connecting said parts together, whereby longitudinal movement thereof relatively to each other is prevented, and a spring encircling said parts and connected at opposite ends thereof, respectively to said parts.

5. In a bicycle, a crank hanger, a crank shaft in two parts journaled in said hanger, a crank on each of said parts, respectively, and a tooth on the inner end of each of said parts, respectively, said teeth adapted to engage each other, the width of each of said teeth being less than the circumferential space between the opposite sides thereof, respectively, whereby one of said parts is adapted to be rotated through a portion of a rotation relatively to the other of said parts.

6. In a bicycle, a crank hanger, a crank shaft in two parts journaled in said hanger, a crank on each of said parts, respectively, a tooth on the inner end of each of said parts, respectively, said teeth adapted to engage each other, the width of each of said teeth being less than the circumferential space between the opposite sides thereof, respectively, whereby one of said parts is adapted to be rotated through a portion of a ratation relatively to the other of said parts, and a spring adapted to normally hold said teeth in engagement with each other.

In testimony whereof I have hereunto set my hand in presence of two subscribing witnesses.

ANTHONY CATALDO.

Witnesses:
CHARLES S. GOODING,
SADIE V. McCARTHY.